(12) United States Patent
Kobori et al.

(10) Patent No.: US 10,042,040 B2
(45) Date of Patent: Aug. 7, 2018

(54) VEHICLE RADAR DEVICE

(71) Applicants: Japan Radio Co., Ltd., Tokyo (JP); Nisshinbo Holdings Inc., Tokyo (JP)

(72) Inventors: Tetsuya Kobori, Tokyo (JP); Hiroki Sugawara, Tokyo (JP); Yukinobu Tokieda, Tokyo (JP); Takahiro Hotta, Tokyo (JP); Naoto Saito, Tokyo (JP)

(73) Assignees: JAPAN RADIO CO., LTD., Tokyo (JP); NISSHINBO HOLDINGS INC., Tokyo (JP)

( * ) Notice: Subject to any disclaimer, the term of this patent is extended or adjusted under 35 U.S.C. 154(b) by 35 days.

(21) Appl. No.: 15/127,940

(22) PCT Filed: Mar. 13, 2015

(86) PCT No.: PCT/JP2015/057446
§ 371 (c)(1),
(2) Date: Sep. 21, 2016

(87) PCT Pub. No.: WO2015/146625
PCT Pub. Date: Oct. 1, 2015

(65) Prior Publication Data
US 2017/0097406 A1    Apr. 6, 2017

(30) Foreign Application Priority Data
Mar. 25, 2014    (JP) .................... 2014-061461

(51) Int. Cl.
*G01S 7/35* (2006.01)
*G01S 13/34* (2006.01)
*G01S 13/60* (2006.01)

(52) U.S. Cl.
CPC ............ *G01S 7/354* (2013.01); *G01S 13/347* (2013.01); *G01S 13/60* (2013.01); *G01S 2007/356* (2013.01)

(58) Field of Classification Search
CPC .. G01S 13/931; G01S 7/354; G01S 2007/356; G01S 13/34; G01S 13/347; G01S 13/343; G01S 7/2922; G01S 7/2927
See application file for complete search history.

(56) References Cited

U.S. PATENT DOCUMENTS 5,416,488 A * 5/1995 Grover .................. G01S 7/2927
                                                       342/109
5,668,739 A   9/1997 League et al.
(Continued)

FOREIGN PATENT DOCUMENTS

CN    1746699 A    3/2006
CN    101089653 A    12/2007
(Continued)

OTHER PUBLICATIONS

International Search Report, dated Jun. 16, 2015, issued in International Patent Application No. PCT/JP2015/057446, 4 pages.
(Continued)

*Primary Examiner* — Peter M Bythrow
(74) *Attorney, Agent, or Firm* — Nixon Peabody LLP; Jeffrey L. Costellia

(57) ABSTRACT

A vehicle radar device provided with a transmission and reception unit for generating a beat signal from a transmission signal and a reception signal, a frequency analysis unit for generating a two-dimensional spectrum including a speed component and a distance component by applying prescribed frequency analysis processing to a signal sequence of the beat signal, and a speed determination unit for dividing the speed component of the two-dimensional spectrum into a plurality of blocks, carrying out constant false alarm rate (CFAR) processing on each of the plurality
(Continued)

of blocks, and specifying the speed of the vehicle of the radar device on the basis of a threshold obtained through the CFAR processing.

5 Claims, 9 Drawing Sheets

(56) References Cited

U.S. PATENT DOCUMENTS

| | | | | |
|---|---|---|---|---|
| 5,923,280 | A * | 7/1999 | Farmer | G01S 7/023 342/129 |
| 5,969,667 | A * | 10/1999 | Farmer | G01S 7/038 342/165 |
| 6,011,507 | A * | 1/2000 | Curran | G01S 7/354 342/70 |
| 6,018,309 | A * | 1/2000 | Mitsumoto | G01S 13/343 342/109 |
| 6,072,424 | A | 6/2000 | Cremona et al. | |
| 6,085,151 | A * | 7/2000 | Farmer | G01S 7/023 342/70 |
| 6,229,474 | B1 * | 5/2001 | Uehara | G01S 7/354 342/109 |
| 6,266,004 | B1 * | 7/2001 | Pannert | G01S 7/352 342/104 |
| 6,369,748 | B1 * | 4/2002 | Uehara | G01S 13/34 342/104 |
| 6,380,887 | B1 * | 4/2002 | Suen | G01S 7/2923 342/159 |
| 6,384,769 | B1 | 5/2002 | Mitsumoto et al. | |
| 7,339,518 | B2 * | 3/2008 | Natsume | G01S 7/36 342/109 |
| 7,436,348 | B2 * | 10/2008 | Nohmi | G01S 7/35 342/159 |
| 7,737,881 | B2 * | 6/2010 | Stove | G01S 13/5246 342/159 |
| 7,791,530 | B2 * | 9/2010 | Puglia | G01S 7/352 342/128 |
| 9,110,152 | B2 * | 8/2015 | Ando | G01S 7/352 |
| 9,157,992 | B2 * | 10/2015 | Wang | G01S 13/0218 |
| 2004/0178943 | A1 * | 9/2004 | Niv | G01S 13/50 342/29 |
| 2005/0156780 | A1 * | 7/2005 | Bonthron | G01S 3/48 342/107 |
| 2005/0225481 | A1 * | 10/2005 | Bonthron | G01S 7/032 342/175 |
| 2006/0262007 | A1 * | 11/2006 | Bonthron | G01S 13/34 342/70 |
| 2008/0088499 | A1 * | 4/2008 | Bonthron | G01S 13/931 342/104 |
| 2009/0096661 | A1 * | 4/2009 | Sakamoto | G01S 7/021 342/92 |
| 2012/0235854 | A1 | 9/2012 | Testar | |
| 2014/0375491 | A1 * | 12/2014 | Roger | G01S 7/354 342/93 |
| 2015/0005993 | A1 | 1/2015 | Breuing | |

FOREIGN PATENT DOCUMENTS

| | | |
|---|---|---|
| CN | 102680967 A | 9/2012 |
| CN | 103308897 A | 9/2013 |
| DE | 10 2012 200 139 A1 | 7/2013 |
| JP | 06102348 A | 4/1994 |
| JP | 10-096774 A | 4/1998 |
| JP | 11-064502 A | 3/1999 |
| JP | 2000501502 A | 2/2000 |
| JP | 2009-025159 A | 2/2009 |
| JP | 2010-175457 A | 8/2010 |
| JP | 2013-088347 A | 5/2013 |
| TW | 200612110 | 4/2006 |

OTHER PUBLICATIONS

Written Opinion of the International Searching Authority, dated Jun. 16, 2015, issued in International Patent Application No. PCT/JP2015/057446, 4 pages.

International Preliminary Report on Patentability, dated Sep. 27, 2016, issued in International Patent Application No. PCT/JP2015/057446, 4 pages.

Office Action dated Apr. 25, 2017 of Chinese Patent Application No. 201580015120.1.

Kleinhempel, W., "Automobile Doppler Speedometer", Vehicle Navigation and Information Systems Conference, 1993, Proceedings of the IEEE-IEE Ottawa, Ont., Canada 12-15 Oct. 1, New York, NY, USA, IEEE, Oct. 12, 1993, pp. 509-512, XP010219775, DOI: 10.1109/VNIS.1993.585683 ISBN: 978-0/7803-1235-7.

European Office Action for Application No. 15768887.0 dated Jan. 9, 2018.

Office Action dated Dec. 5, 2017 of Japanese Patent Application No. 2014-061461.

Taiwanese Office Action for 104108294 dated May 8, 2018.

* cited by examiner

VEHICLE RADAR DEVICE

CROSS REFERENCE TO RELATED APPLICATIONS

This application is a U.S. national phase of International Patent Application No. PCT/JP2015/057446, filed Mar. 13, 2015, which claims the benefit of Japanese Patent Application No. 2014-061461, filed Mar. 25, 2014, the contents of which are incorporated herein by reference in their entirety.

TECHNICAL FIELD

The present invention relates to a vehicle radar device.
Priority is claimed on Japanese Patent Application No. 2014-061461, filed Mar. 25, 2014, the content of which is incorporated herein by reference.

BACKGROUND ART

Conventionally, there is a vehicle multi-frequency continuous wave (CW) radar device that acquires a velocity and a distance of a target from reflected waves that is obtained when a frequency of transmission waves is changed stepwise (see, for example, Patent Literature 1). Normally, in a vehicle radar device, it is necessary to consider a velocity of an own vehicle in order to acquire a ground velocity of a target. Therefore, this type of radar device acquires velocity information of the own vehicle from, for example, an engine control unit of the vehicle.

CITATION LIST

Patent Literature

Patent Literature 1

Japanese Unexamined Patent Application, First Publication No. 2009-25159

SUMMARY OF INVENTION

Technical Problem

When a radar device acquires velocity information of an own vehicle from the vehicle, it is necessary to data-transfer velocity information of the own vehicle from the vehicle to the radar device, and this requires communication. In this case, since a delay is caused by the data transfer, it is difficult for the radar device to recognize a velocity of the own vehicle in real time. Further, a communication process for data transfer is required in the radar device, and a load for the same communication process is generated on the vehicle side or the like.

The present invention has been made in view of the above circumstances, and an object thereof is to provide a vehicle radar device capable of acquiring a velocity of an own vehicle without requiring communication with the vehicle.

Solution to Problem

According to a first aspect of the present invention, a vehicle radar device includes a transmission and reception unit that changes a frequency of a transmission signal to transmit transmission waves, receives reflected waves of the transmission waves, and generates a beat signal from a reception signal obtained through receiving and the transmission signal; a frequency analysis unit that generates a two-dimensional spectrum including a velocity component and a distance component by performing a predetermined frequency analysis process on a signal sequence of the beat signal; and a velocity specifying unit that divides the two-dimensional spectrum into a plurality of blocks with respect to the velocity component, performs constant false alarm rate (CFAR) processing on each of the plurality of blocks, and specifies a velocity of an own vehicle based on a threshold value obtained by performing the CFAR processing.

According to the first aspect, the velocity specifying unit specifies the velocity of the own vehicle from the threshold value of the plurality of blocks in the two-dimensional spectrum generated by the frequency analysis unit. Here, a signal component due to a stationary clutter included in the reflected waves is concentrated in a velocity component of the two-dimensional spectrum corresponding to the velocity if the velocity of the own vehicle is constant. Therefore, a threshold value of a block in which the clutter is concentrated among the plurality of blocks tends to be significantly greater than a threshold value of the other blocks. Based on such a tendency of the threshold value, the velocity identifying unit specifies the velocity of the own vehicle from the velocity component of the two-dimensional spectrum corresponding to the block in which the clutter is concentrated.

According to a second aspect of the present invention, in the vehicle radar device of the first embodiment, for example, the velocity specifying unit may divide the plurality of blocks into a plurality of cells with respect to the distance component of the two-dimensional spectrum, may perform the CFAR processing on each of the plurality of cells, acquires a maximum value of a threshold value obtained by performing the CFAR processing, and may specify a velocity component of the two-dimensional spectrum corresponding to a cell in which a maximum value of the threshold value is acquired among the plurality of cells as the velocity.

According to a third aspect of the present invention, in the vehicle radar device of the first aspect or the second aspect, for example, the frequency analysis unit may perform a two-dimensional Fast Fourier Transform (FFT) as the predetermined frequency analysis process.

According to a fourth aspect of the present invention, in the vehicle radar device of the third aspect, for example, the transmission and reception unit changes a frequency of the transmission signal in a first period, forms transmission waves by repeating, in a second period, the transmission signal of which the frequency is changed in the first period, transmits the transmission waves, receives reflected waves of the transmission waves, and generates the beat signal from the reception signal obtained through receiving the transmission signal, and the frequency analysis unit performs the two-dimensional FFT on a two-dimensional signal sequence including a first signal sequence including the beat signal generated in the first period and a second signal sequence including the beat signal generated in the second period.

Advantageous Effects of Invention

According to each aspect of the present invention, it is possible to acquire velocity of an own vehicle without requiring communication with a vehicle.

DESCRIPTION OF EMBODIMENTS

Hereinafter, an embodiment of the present invention will be described with reference to the accompanying drawings.

Figure 1:
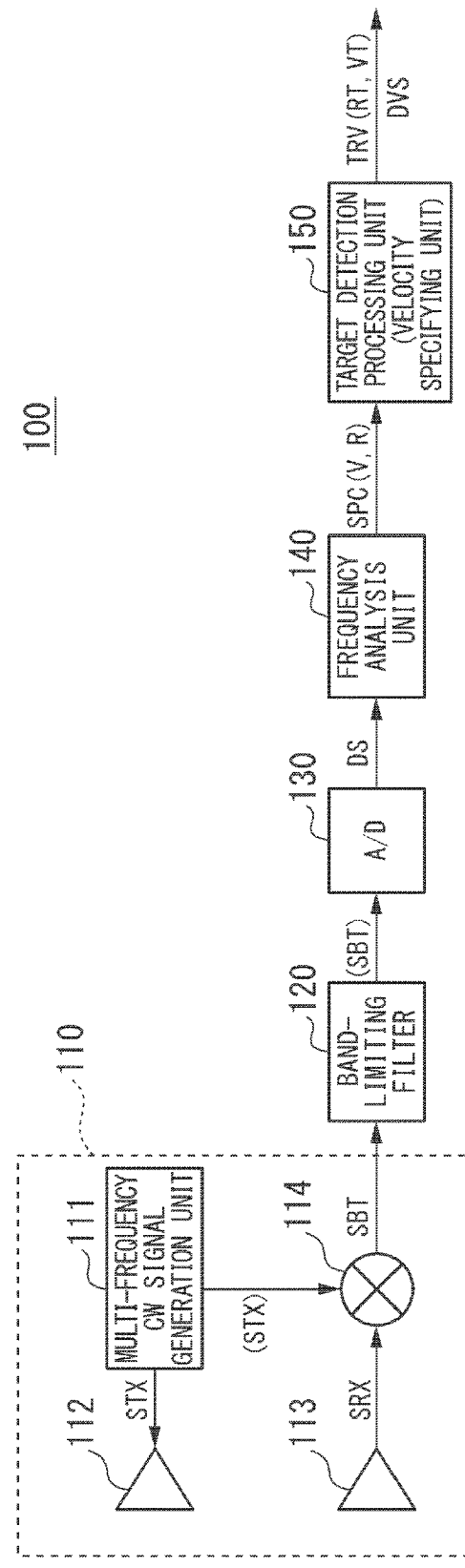
FIG. 1 is a diagram illustrating a configuration example of a vehicle radar device according to an embodiment of the present invention.

FIG. 1 is a diagram illustrating a configuration example of a vehicle radar device 100 according to an embodiment of the present invention.

The vehicle radar device 100 according to this embodiment includes a transmission and reception unit 110, a band-limiting filter 120, an analog/digital (A/D) converter 130, a frequency analysis unit 140, and a target detection processing unit 150 (a velocity specifying unit).

The transmission and reception unit 110 changes a frequency of a transmission signal STX, transmits transmission waves (continuous wave (CW) modulation waves), and generates a beat signal SBT from a reception signal SRX obtained by receiving reflected waves of the transmission waves and the transmission signal STX. The transmission and reception unit 110 includes a multi-frequency CW signal generation unit 111, a transmission antenna 112, a reception antenna 113, and a mixer 114.

Here, the multi-frequency CW signal generation unit 111 stepwise changes a frequency of a CW signal to generate the transmission signal STX. The transmission signal STX is supplied to the transmission antenna 112. The transmission antenna 112 radiates the transmission signal STX as transmission waves to a space. The transmission antenna 112 is, for example, an antenna having directivity and is installed so that a radiation direction of the transmission waves is directed in a traveling direction of the vehicle. The reception antenna 113 receives the reflected waves of the transmission waves radiated from the transmission antenna 112. The mixer 114 mixes the transmission signal STX generated by the multi-frequency CW signal generation unit 111 with the reception signal SRX received by the reception antenna 113 to generate the beat signal SBT.

The band-limiting filter 120 suppresses a signal component other than the beat signal SBT and extracts the beat signal SBT from an output signal of the mixer 114. The A/D converter 130 samples the beat signal SBT of an analog amount that has passed through the band-limiting filter 120 to generate sample data DS indicating a digital value of the beat signal. The frequency analysis unit 140 performs a predetermined frequency analysis process on a data sequence of the sample data DS corresponding to a signal sequence of the beat signal SBT to generate a two-dimensional spectrum SPC including a velocity component V and a distance component R.

The target detection processing unit 150 performs a target detection process (for example, measurement velocity processing or measurement distance processing) for detecting a target (not illustrated) from the two-dimensional spectrum SPC. The target detection processing unit 150 outputs target detection data TRV including a distance RT to the target and a velocity VT of the target (the ground velocity) as a result of the target detection process. Further, the target detection processing unit 150 functions as a vehicle velocity specifying unit that specifies the velocity of an own vehicle (a vehicle having the vehicle radar device 100 attached thereto). The target detection processing unit 150 as a velocity specifying unit divides the above-described two-dimensional spectrum SPC into a plurality of blocks with respect to the velocity component V, and specifies the velocity of the own vehicle based on a detection threshold value DT obtained by performing a constant false alarm rate (CFAR) process on each of the plurality of blocks. In this embodiment, the target detection processing unit 150 as a velocity specifying unit further divides each of the plurality of blocks into a plurality of cells with respect to the distance component R of the two-dimensional spectrum SPC, and performs a CFAR process on each of the plurality of cells to acquire the detection threshold value DT for each cell. The target detection process unit 150 acquires own vehicle velocity data DVS indicating the velocity of the own vehicle using the detection threshold value DT obtained by the CFAR process, which will be described in detail below.

Next, an operation of the vehicle radar device 100 according to this embodiment will be described.

Schematically, the vehicle radar device 100 generates the two-dimensional spectrum SPC from the beat signal SBT obtained based on the transmission signal STX and the reception signal SRX, performs a target detection process on the two-dimensional spectrum SPC to generate the target detection data TRV indicating the distance RT up to a target and the velocity VT (the ground velocity) of the target. Further, the vehicle radar device 100 generates the own vehicle velocity data DVS by performing an own vehicle velocity acquisition process in parallel with the target detection process. This own vehicle velocity data DVS is used, for example, to calculate the velocity VT (the ground velocity) of the target from the velocity component V (relative velocity) that is obtained from the two-dimensional spectrum SPC.

In this embodiment, since it is assumed in the target detection process and the own vehicle velocity acquisition process that the two-dimensional spectrum SPC has been generated, an operation up until the two-dimensional spectrum SPC is generated will be described before the target detection process and the own vehicle velocity acquisition process are described in detail.

The multi-frequency CW signal generation unit 111 of the transmission and reception unit 110 generates the transmission signal STX that is a CW modulation signal by changing a frequency stepwise over time, as will be described below.

Figure 2:
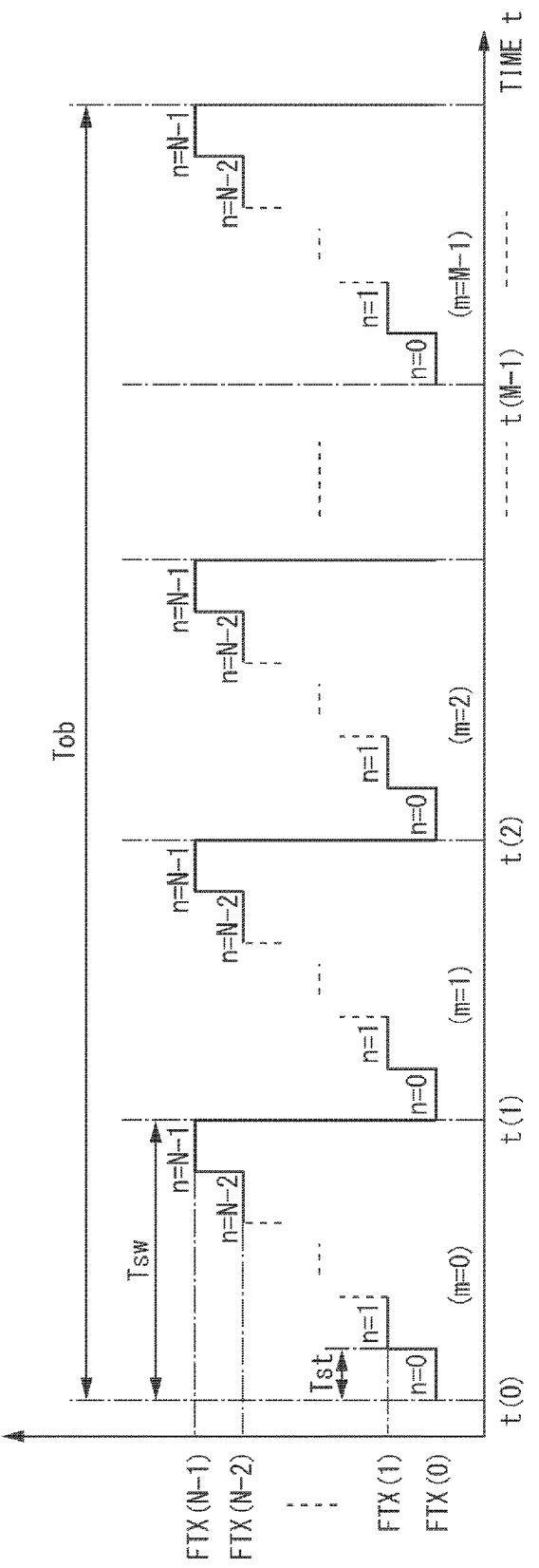
FIG. 2 is a diagram illustrating an operation of the vehicle radar device according to an embodiment of the present invention, and illustrating a transmission signal.

FIG. 2 is a diagram illustrating an operation of the vehicle radar device 100 according to an embodiment of the present invention and is a diagram illustrating the transmission signal STX. As illustrated in FIG. 2, the multi-frequency CW signal generation unit 111 changes (increases or decreases) a transmission frequency FTX of the transmission signal STX by a certain value in a first period Tst to generate the transmission signal STX of which the transmission frequency FTX is changed stepwise. In the example of FIG. 2, a variable n (n=0, 1, 2, . . . , N−2, N−1) (N is an arbitrary integer) indicating each step of the change of the transmission frequency FTX is increased by 1 in each first period Tst, and the transmission frequency FTX is increased by a constant value each time the variable n increases. Accordingly, the transmission frequencies FTX(0), FTX(1), FTX(N−2), and FTX(N−1) are sequentially obtained as the transmission frequency FTX of the transmission signal STX in the predetermined first period Tst. The present invention is not limited to the above-described example, and the transmission frequency FTX may be decreased by a constant value each time the variable n increases.

Subsequently, the multi-frequency CW signal generation unit 111 repeatedly outputs the transmission signal STX of which the frequency is stepwise changed in the first period Tst described above in a predetermined second period Tsw that is equal to or greater than N times the first period Tst. In the example of FIG. 2, a variable m (0, 1, . . . , M−1) (M is an arbitrary integer) indicating a repeating step of the transmission signal STX is increased by "1" in the second period Tsw, and transmission frequencies FTX(0), FTX(1), FTX(N−2), and FTX(N−1) are repeatedly obtained as the transmission frequency FTX each time the variable m increases. The transmission and reception unit 110 transmits transmission waves formed of the transmission signal STX having the transmission frequency FTX illustrated in FIG. 2 from the transmission antenna 112.

Subsequently, the transmission and reception unit 110 receives reflected waves that are generated when the target is irradiated with the transmission waves transmitted from the transmission antenna 112 using the reception antenna 113. The reflected waves include a clutter component from a road surface or the like. The mixer 114 of the transmission and reception unit 110 generates the beat signal SBT from the reception signal SRX obtained by receiving the reflected waves using the reception antenna 113 and the transmission signal STX generated by the multi-frequency CW signal generation unit 111. The beat signal SBT is a signal indicating a phase difference between the transmission signal STX and the reception signal SRX. The beat signal SBT passes through the band-limiting filter 120, and is sampled by the A/D converter 130 and converted into a digital value. Accordingly, the sample data DS indicating the digital amount of the beat signal SBT is obtained.

Subsequently, the frequency analysis unit 140 generates the two-dimensional spectrum SPC from the above-described sample data DS. Specifically, the frequency analysis unit 140 generates two-dimensional matrix data (hereinafter referred to as "two-dimensional data") from the sample data DS of the beat signal SBT acquired in each step that is specified by two variables including the variable n and the variable m illustrated in FIG. 2. In a two-dimensional plane corresponding to the two-dimensional data, each item of the sample data DS is arranged to correspond to the value of the variable n in an axial direction indicating a dimension corresponding to the variable n, and each item of the sample data DS is arranged to correspond to the value of the variable m in an axial direction indicating another dimension corresponding to the variable m. However, this two-dimensional data of the sample data DS is conceptual and, in fact, the two-dimensional data is created, for example, by allocating each item of the sample data DS in an address space of a memory specified by the variables m and n.

In such two-dimensional data, the sample data DS of a two-dimensional signal sequence including a first signal sequence including the beat signal SBT which is generated in the first period Tst illustrated in FIG. 2 and a second signal sequence including the beat signal SBT which is generated in the second period Tsw is included. Here, the first signal sequence is a set of beat signals corresponding to the respective transmission frequencies FTX(0), FTX(1), FTX (N−1) of the respective steps specified by the variable n in a period of time of each repetition period indicated by the variable m in FIG. 2 (for example, a period of time from time t(0) to time t(1) in FIG. 2). For example, N beat signals corresponding to the steps specified by the variable n exist in a period of time of the repetition period when the value of the variable m is "0" (the period of time from time t(0) to time t(1) in FIG. 2), and a set of the beat signals forms one first signal sequence. In the example of FIG. 2, a total of M first signal sequences exist corresponding to the number M of repetition periods indicated by the variable m.

Further, the second signal sequence is a set of beat signals corresponding to the step specified by the variable n in FIG. 2, and is a set of M beat signals obtained in a period of time of each of M repetition periods indicated by the variable m. For example, if attention is paid to a step when a value of the variable n is "0", the M beat signals corresponding to the M repetition periods specified by the variable m exists, and a set of the M beat signals form one second signal sequence. In the example of FIG. 2, a total of N second signal sequences exist corresponding to the number N of steps.

The frequency analysis unit 140 generates the two-dimensional spectrum SPC by performing a two-dimensional fast Fourier transform (FFT) as a predetermined frequency analysis process on the sample data DS of the two-dimensional signal sequence including the first signal sequence and the second signal sequence described above, as will be described below.

Figure 3A:
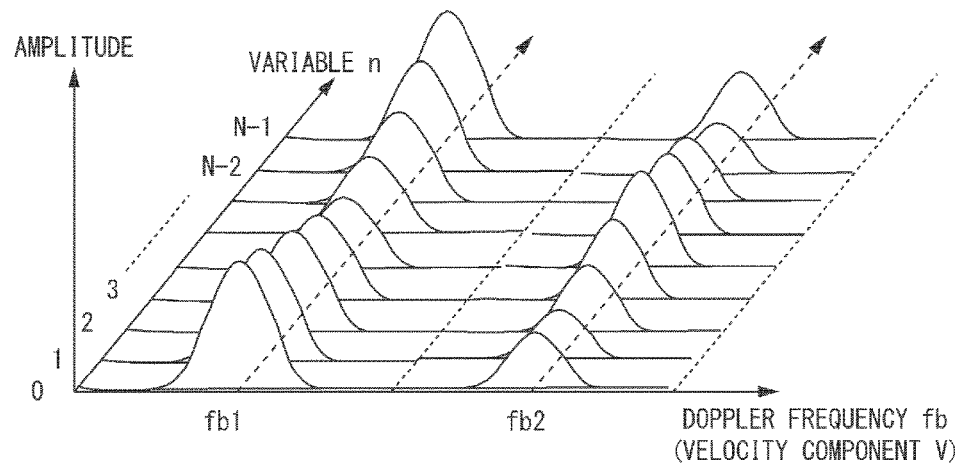
FIG. 3A is a diagram illustrating an operation of the vehicle radar device according to an embodiment of the present invention, and illustrating a process of a first step of a frequency analysis process.
Figure 3B:
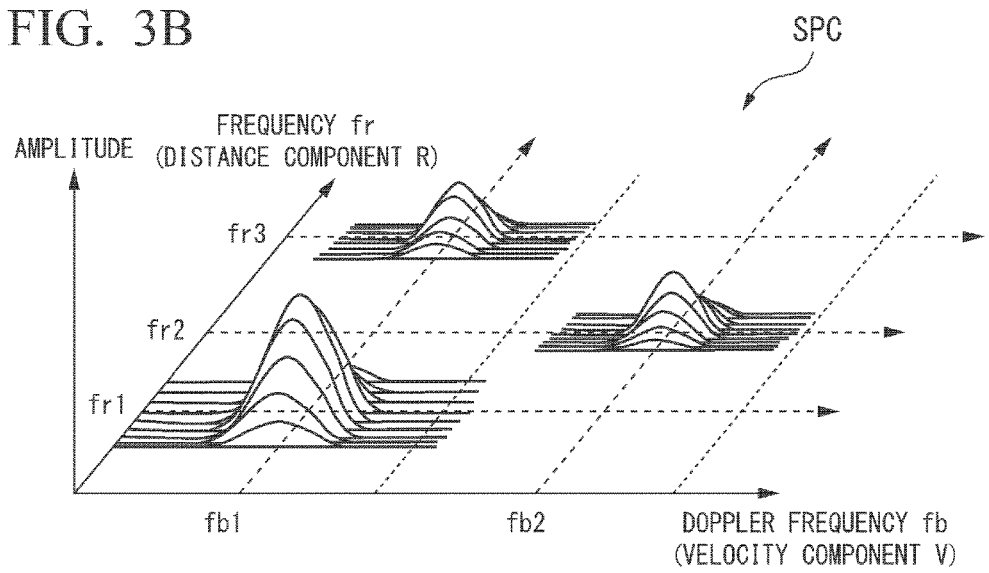
FIG. 3B is a diagram illustrating an operation of the vehicle radar device according to an embodiment of the present invention, and illustrating a second step of the frequency analysis process.

FIGS. 3A and 3B are diagrams illustrating an operation of the vehicle radar device 100 according to an embodiment of the present invention. FIG. 3A is a diagram illustrating a process of a first step of a frequency analysis process, and FIG. 3B is a diagram illustrating a process of a second step of a frequency analysis process.

The frequency analysis unit 140 first performs a FFT regarding the first signal sequence among the first signal sequence and the second signal sequence included in the two-dimensional signal sequence described above in the process of the first step of the frequency analysis process. That is, the frequency analysis unit 140 performs the FFT in a direction of the variable m for the two-dimensional signal sequence described above. Accordingly, as illustrated in FIG. 3A, the spectrum of a Doppler frequency fb corresponding to the velocity component V can be obtained for each of the variables n.

Subsequently, the frequency analysis unit 140 performs a FFT regarding the second signal sequence on a processing result of the FFT regarding the first signal sequence described above in the process of the second step of the frequency analysis process. That is, the frequency analysis unit 140 performs the FFT in a direction of the variable n for the signal sequence of the spectrum at the Doppler frequency fb illustrated in FIG. 3A. Accordingly, as illustrated in FIG. 3B, a spectrum at a frequency fr corresponding to the distance component R is obtained for each of the Doppler frequencies fb.

As a result of the frequency analysis process (the two-dimensional FFT) described above, the frequency analysis unit 140 obtains the two-dimensional spectrum SPC including the Doppler frequency fb corresponding to the velocity component V of the own vehicle and the frequency fr corresponding to the distance component R to the target. The frequency analysis unit 140 stores a value indicating a signal level (amplitude) corresponding to the frequency components (fb and fr) of the two-dimensional spectrum SPC in a memory (not illustrated). In this embodiment, the memory that stores the two-dimensional spectrum SPC is included in the frequency analysis unit 140, but the prevent invention is not limited to this example. Such a memory may be included outside the frequency analysis unit 140. Thus, the two-dimensional spectrum SPC is generated.

Next, a target detection process and an own vehicle velocity acquisition process for the above-described two-dimensional spectrum SPC will be described.

Figure 4A:
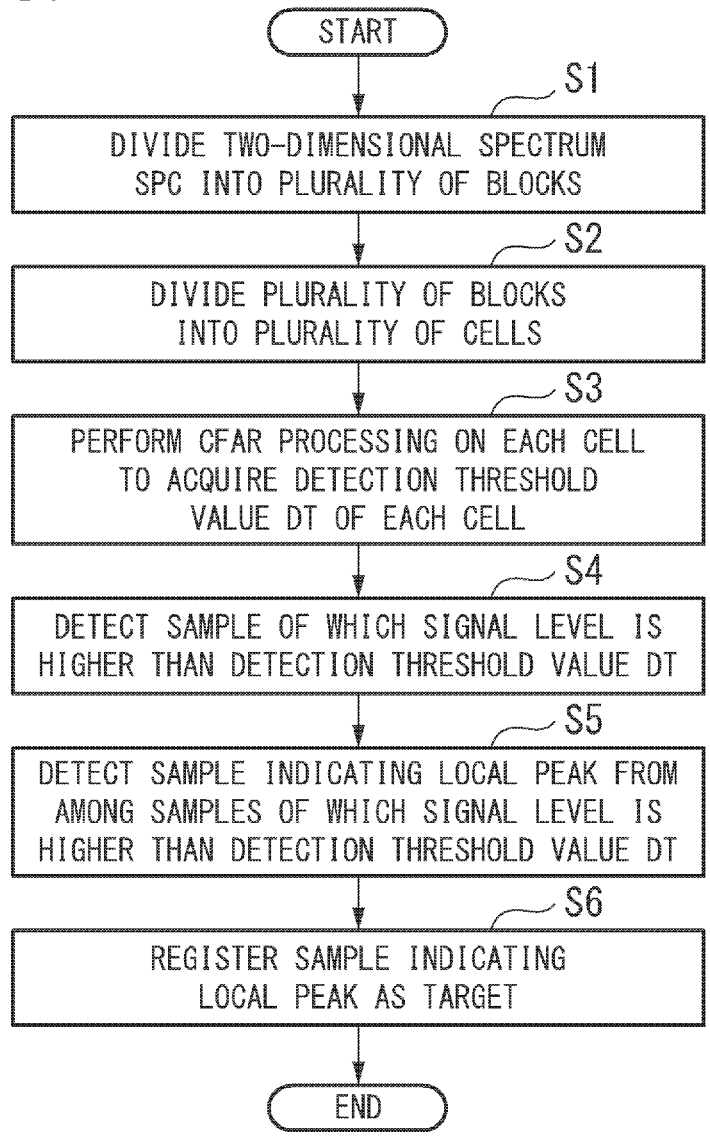
FIG. 4A is a diagram illustrating a flow of an operation example of the vehicle radar device according to an embodiment of the present invention, and illustrating a flow of a target detection process.
Figure 4B:
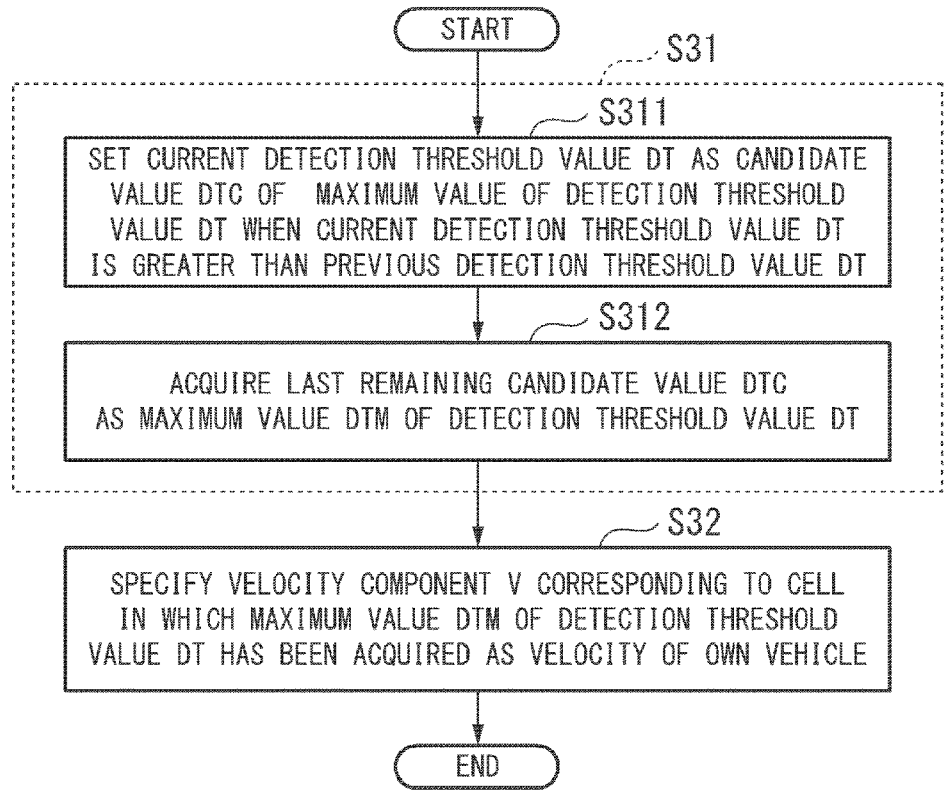
FIG. 4B is a diagram illustrating an operation of the vehicle radar device according to an embodiment of the present invention, and illustrating a flow of an own vehicle velocity acquisition process.

FIGS. 4A and 4B are diagrams indicating a flow of an operation example of the vehicle radar device 100 according to an embodiment of the present invention. FIG. 4A illustrates a flow of the target detection process, and FIG. 4B illustrates a flow of the own vehicle velocity acquisition process.

First, a flow of an operation of the vehicle radar device 100 will be described along the flow of FIG. 4A while paying attention to a target detection process for generating the target detection data TRV.

The target detection processing unit 150 divides the above-described two-dimensional spectrum SPC generated by the frequency analysis unit 140 into a plurality of blocks, as will be described below (step S1).

Figure 5A:
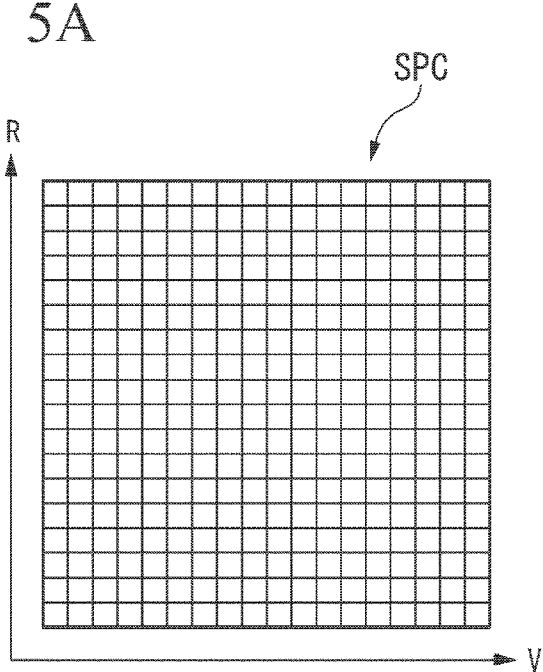
FIG. 5A is a diagram illustrating an operation of the vehicle radar device according to an embodiment of the present invention, illustrating an example of a scheme of dividing a two-dimensional spectrum SPC, and schematically illustrating the two-dimensional spectrum SPC of a division target.
Figure 5B:
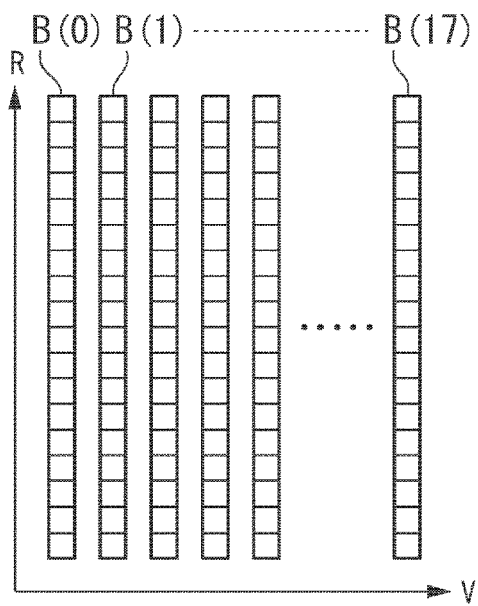
FIG. 5B is a diagram illustrating an operation of the vehicle radar device according to an embodiment of the present invention, illustrating an example of a scheme of dividing the two-dimensional spectrum SPC, and illustrating the two-dimensional spectrum SPC divided into a plurality of blocks.
Figure 5C:
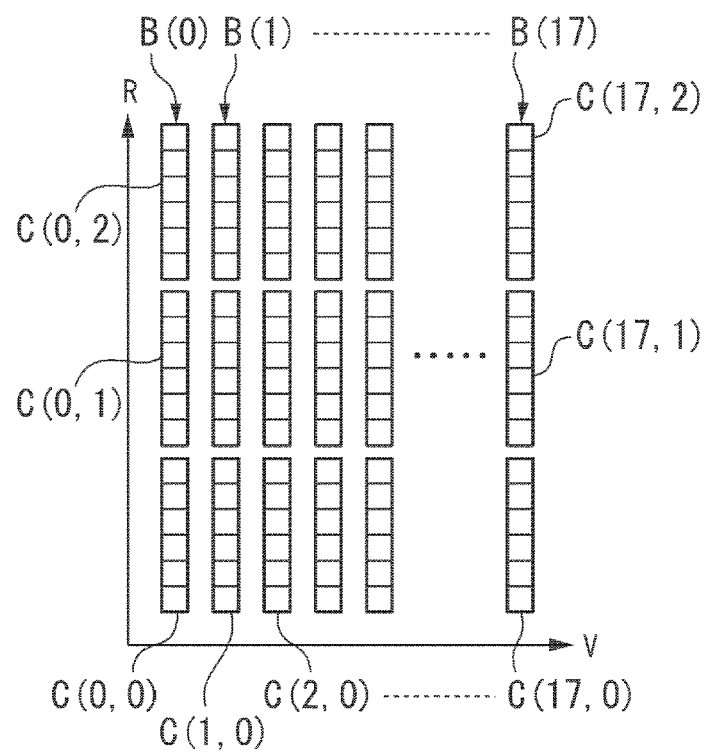
FIG. 5C is a diagram illustrating an operation of the vehicle radar device according to an embodiment of the present invention, illustrating an example of a scheme of dividing the two-dimensional spectrum SPC, and illustrating the two-dimensional spectrum SPC divided into a plurality of cells.

FIGS. 5A, 5B and 5C are diagrams illustrating an operation of the vehicle radar device 100 according to an embodiment of the present invention, and are diagrams illustrating an example of a method of dividing the two-dimensional spectrum SPC. Here, FIG. 5A schematically illustrates the two-dimensional spectrum SPC that is a division target, FIG. 5B illustrates the two-dimensional spectrum SPC divided into a plurality of blocks B(0), B(1), . . . , B(17), and FIG. 5C illustrates the two-dimensional spectrum SPC divided into a plurality of cells C(0,0), C(1,0), C(2,0), . . . , C(17,2). In FIGS. 5A, 5B, and 5C, a horizontal axis indicates a frequency corresponding to the velocity component V, and a vertical axis indicates a frequency corresponding to the distance component R.

In a first division step, the target detection processing unit 150 divides the two-dimensional spectrum SPC illustrated in FIG. 5A into the plurality of blocks B(0), B(1), . . . , B(17) with respect to the velocity component V, as illustrated in FIG. 5B. In the example of FIG. 5B, the two-dimensional spectrum SPC is divided into eighteen blocks B(0), B(1), . . . , B(17) in order to simplify the description, but the number of blocks is not limited to this example and is arbitrary.

Figure 6:
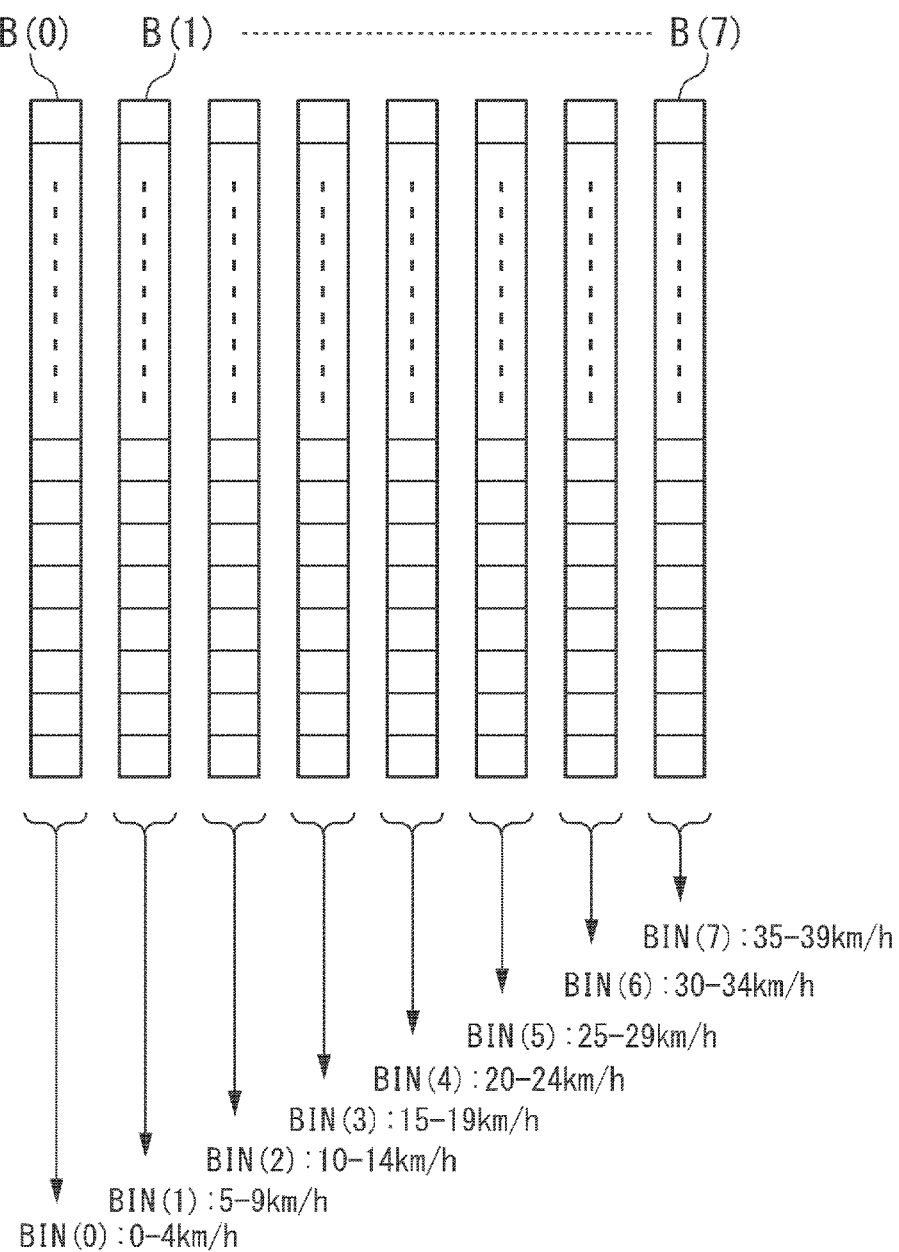
FIG. 6 is a diagram illustrating an operation of the vehicle radar device according to an embodiment of the present invention, and illustrating details of block division of the two-dimensional spectrum SPC.

FIG. 6 is a diagram illustrating an operation of the vehicle radar device 100 according to an embodiment of the present invention, and is a diagram illustrating details of block division of the two-dimensional spectrum SPC. In FIG. 6, eight blocks B(0) to B(7) among the eighteen blocks B(0) to B(17) illustrated in FIGS. 5B and 5C are shown as representative blocks.

In this embodiment, the target detection processing unit 150 divides the two-dimensional spectrum SPC into the plurality of blocks B(0), B(1), . . . , B(17) in association with predetermined velocity bins BIN(0), BIN(1), BIN(17). In the example of FIG. 6, the velocity bin BIN(0) indicates a velocity section of 0 to 4 km/h, and corresponds to the block B(0). The velocity bin BIN(1) indicates a velocity section of 5 to 9 km/h, and corresponds to the block B(1). Hereinafter, similarly, the velocity bin BIN(7) indicates a velocity section of 35 to 39 km/h, and corresponds to the block B(7). The definition of the velocity bin in FIG. 6 is merely an example, and a velocity section corresponding to each velocity bin may be appropriately determined according to the required accuracy.

Refer back to FIGS. 5B and 5C. In a second division step, the target detection processing unit 150 divides each of the plurality of blocks B(0), B(1), . . . , B(17) illustrated in FIG. 5B with respect to the distance component R to divide the two-dimensional spectrum SPC into the plurality of cells C(0,0), C(1,0), C(2,0), . . . , C(17,2), as illustrated in FIG. 5C (step S2). In the example of FIG. 5C, the two-dimensional spectrum SPC is divided into a total of 54 (=18×3) cells. In this embodiment, in order to acquire a velocity (a ground velocity) of an own vehicle from a signal component due to road surface clutter, the number and the size of the respective cells are set so that a shape of each cell is a shape corresponding to a distribution of signal components due to clutter on a road surface in the two-dimensional spectrum SPC. The number and the size of the cells are not limited to this example and are arbitrary.

Subsequently, the target detection processing unit 150 performs CFAR processing on each of the plurality of cells C(0,0), C(1,0), C(2,0), . . . , C(17,2) to sequentially acquire the detection threshold value DT of each cell (step S3). In this process of acquiring the detection threshold value DT, the target detection processing unit 150 performs an own vehicle velocity acquisition process (steps S31 and S32 in FIG. 4B) for acquiring the own vehicle velocity data DVS indicating the velocity (the ground velocity) of the own vehicle using the detection threshold value DT, and details will be described below.

Subsequently, the target detection processing unit 150 detects a sample of which a signal level is higher than the detection threshold value DT, for each cell (step S4). Subsequently, the target detection processing unit 150 detects a sample indicating a local peak from among the samples of which the signal level is higher than the detection threshold value DT in each cell among all samples indicating the respective signal levels of the two-dimensional spectrum SPC (step S5). Here, the sample indicating the local peak refers to a sample of which the signal level indicates a maximum value. The target detection processing unit 150 registers the sample indicating the local peak as a sample indicating a target signal component (step S6), and specifies the velocity component V and the distance component R in the two-dimensional spectrum SPC corresponding to this sample. Among the velocity component V and the distance component R specified from the sample indicating the local peak described above, the velocity component V indicates a relative velocity between the target and the own vehicle, and the distance component R indicates a distance between the target and the own vehicle. The target detection processing unit 150 subtracts the velocity (the ground velocity) of the own vehicle acquired in the own vehicle velocity acquisition process to be described below from the velocity component V indicating the relative velocity between the target and the own vehicle to calculate the velocity VT (the ground velocity) of the target, and outputs the velocity VT of the target and the distance RT to the target as the target detection data TRV. Accordingly, the target detection process is performed, and the target detection data TRV is obtained.

Next, a flow of the operation of the vehicle radar device 100 will be described along a flow of FIG. 4B while paying attention to the own vehicle velocity acquisition process for generating the own vehicle velocity data DVS indicating the velocity (the ground velocity) of the own vehicle.

The target detection processing unit 150 functions as a velocity specifying unit in a process of sequentially acquiring the detection threshold value DT of each cell in step S3 of the target detection process described above, and performs the own vehicle velocity acquisition process for acquiring the own vehicle velocity data DVS. In this vehicle velocity acquisition process, the target detection processing unit 150 acquires a maximum value DTM of the detection threshold value DT obtained by performing CFAR processing on each of the plurality of cells C(0,0), C(1,0), C(2,0), . . . , C(17,2) illustrated in FIG. 5C (step S31).

Specifically, the target detection processing unit 150 compares the detection threshold value DT of the cell that is the current target of the CFAR processing with the detection threshold value DT of the cell that is a previous target of the CFAR processing in the process of sequentially acquiring the detection threshold value DT of each cell, and sets the current detection threshold value DT of the cell as a candidate value DTC of the maximum value of the detection threshold value DT when the current detection threshold value DT is greater than the previous detection threshold value DT (step S311). The target detection processing unit 150 repeats the same comparison process to update the candidate value DTC of the maximum value of the detection threshold value DT each time the CFAR processing is performed on each of the plurality of cells C(0,0), C(1,0), C(2,0), . . . , C(17,2) and a new detection threshold value DT is acquired. The target detection processing unit 150 acquires the last remaining candidate value DTC as the maximum value DTM of the detection threshold value DT (step S312).

Subsequently, the target detection processing unit 150 specifies the velocity component V in the two-dimensional spectrum SPC indicated by a velocity bin (see FIG. 6) corresponding to a cell in which the maximum value DTM of the detection threshold value DT has been acquired among the plurality of cells C(0,0), C(1,0), C(2,0), . . . , C(17,2), as the velocity (the ground velocity) of the own vehicle (step S32), generates the own vehicle velocity data DVS from the velocity component V, and outputs the own vehicle velocity data DVS. Here, the signal components due to the clutter on the road surface tend to be concentrated in the same frequency component as the velocity (the ground velocity) of the own vehicle. Since a shape (see FIG. 5C) of each cell of the divided two-dimensional spectrum SPC is set to a shape corresponding to the distribution (see FIG. 7A) of the signal components due to the clutter on the road surface as described above, a large number of the signal components due to the clutter on the road surface are included in the cell in which the maximum value DTM of the detection threshold value DT has been acquired. Therefore, the velocity component V in the two-dimensional spectrum SPC corresponding to the cell in which the maximum value DTM of the detection threshold value DT has been acquired can be specified as the velocity of the own vehicle. The shape of the cell corresponding to the distribution (see FIG. 7A) of the signal components due to the clutter on the road surface can be set arbitrarily as long as the signal components due to the clutter on the road surface can be detected.

The velocity (the ground velocity) of the own vehicle indicated by the own vehicle velocity data DVS is used when the velocity VT (the ground velocity) of the target included in the target detection data TRV is calculated in the target detection process described above. Specifically, the target detection processing unit 150 calculates the velocity VT (the ground velocity) of the target by subtracting the velocity (the ground velocity) of the own vehicle indicated by the velocity component V (the own vehicle velocity data DVS) corresponding to the cell in which the maximum value DTM of the detection threshold value DT has been acquired in the own vehicle velocity acquisition process from the velocity (a relative velocity) of the target indicated by the velocity component V of the sample indicating a local peak in the target detection process described above. The target detection processing unit 150 outputs the velocity (the ground velocity) of the own vehicle as the own vehicle velocity data DVS, and outputs the velocity VT (the ground velocity) of the target and the distance RT to the target as the target detection data TRV. A method of using the own vehicle velocity data DVS and the target detection data TRV is arbitrary. For example, the own vehicle velocity data DVS and the target detection data TRV are presented as information on the target to a driver of the own vehicle.

Figure 7A:
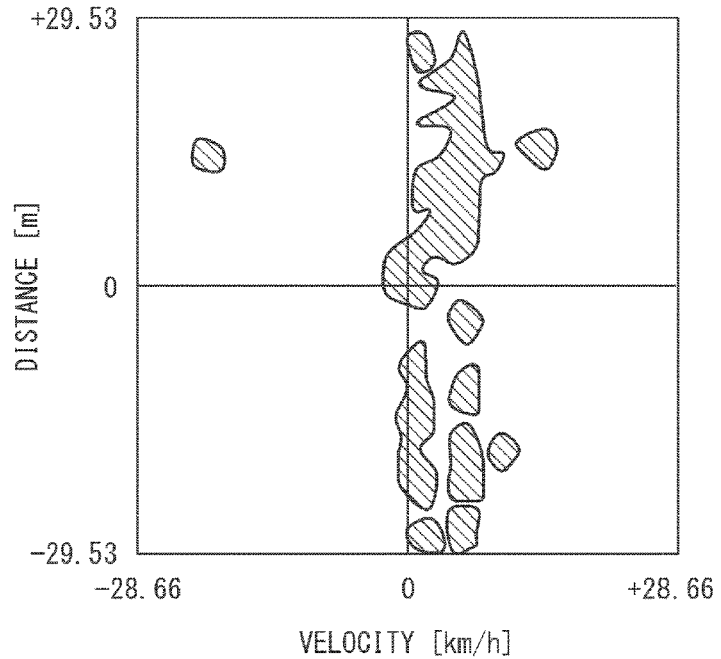
FIG. 7A is a diagram illustrating an example of a two-dimensional spectrum obtained as an experimental result of the vehicle radar device according to an embodiment of the present invention, and schematically illustrating the two-dimensional spectrum obtained as the experimental result.
Figure 7B:
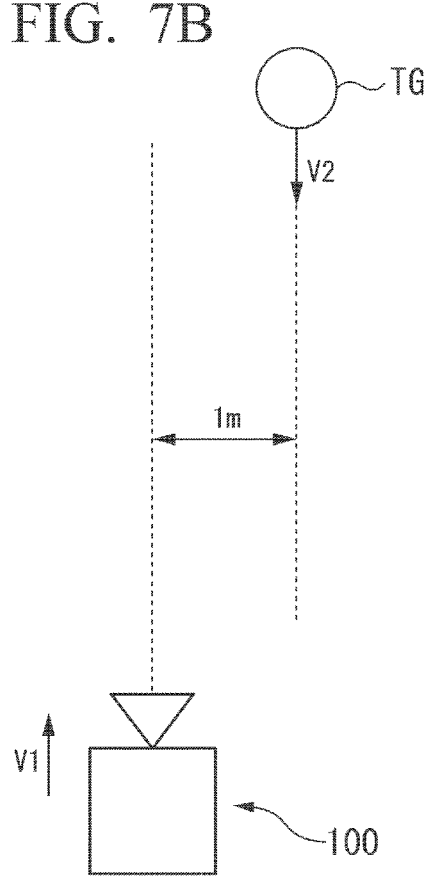
FIG. 7B a diagram illustrating an example of a two-dimensional spectrum obtained as an experimental result of the vehicle radar device according to an embodiment of the present invention, and illustrating a condition set in the experiment.

FIGS. 7A and 7B are diagrams illustrating an example of a two-dimensional spectrum obtained as an experimental result of the vehicle radar device 100 according to an embodiment of the present invention. Here, FIG. 7A schematically illustrates a two-dimensional spectrum obtained as an experimental result, and FIG. 7B illustrates a condition set in the experiment. As illustrated in FIG. 7B, the vehicle radar device 100 is mounted on a vehicle (an own vehicle) traveling at a constant velocity V1 (a ground velocity). In this experiment, the velocity V1 of the own vehicle is set to be about 4 km/h. A target TG approaches while moving at a ground velocity V2 from the front of the own vehicle. A distance between a travel path of the vehicle having the vehicle radar device 100 mounted thereon and a travel path of the target TG is set to about 1 m.

As illustrated in FIG. 7A, a signal component (a hatched area) including reflected waves from the target TG and a clutter component on a road surface is included in the two-dimensional spectrum obtained as an experimental result. However, in the experiment, a velocity bin that is a reference when the two-dimensional spectrum is divided is different from that illustrated in FIG. 6 described above and is set in units of 1 km/h. In the example of FIG. 7A, the signal component (the hatched area) including the reflected waves from the target TG and the clutter component on the road surface is generally concentrated in an area of a velocity bin equal to or lower than 10 km/h. In this case, for example, the detection threshold value DT of the cell belonging to the block B(0) indicated by the velocity bin BIN(0) corresponding to 0 to 4 km/h illustrated in FIG. 6 described above, and the detection threshold value DT of the cell belonging to the block B(1) indicated by the velocity bin BIN(1) corresponding to 5 to 9 km/h tend to increase. The target detection processing unit 150 specifies the velocity component V as the own vehicle velocity from a velocity bin of a block to which a cell corresponding to the detection threshold value DT indicating the maximum value belongs.

Figure 8:
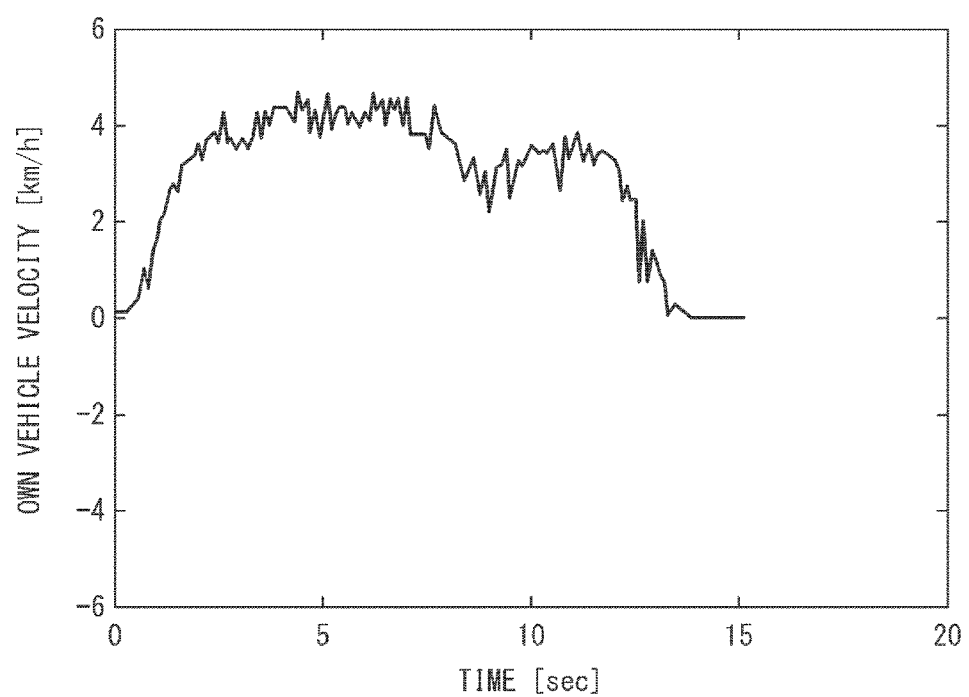
FIG. 8 is a diagram illustrating an example of a vehicle velocity obtained as an experimental result of the vehicle radar device according to an embodiment of the present invention.

FIG. 8 is a diagram illustrating an example of a vehicle velocity obtained as an experimental result of the vehicle radar device 100 according to an embodiment of the present invention. In FIG. 8, a horizontal axis indicates time, and a vertical axis indicates the vehicle velocity obtained as the experimental result. As understood from FIG. 8, an own vehicle velocity gradually increases with a travel start of the vehicle, and in a constant velocity travel state, the own vehicle velocity obtained as a result of the experiment is stabilized as about 4 km/h, which is a set velocity. Effectiveness of the own vehicle velocity acquired by the vehicle radar device 100 according to this embodiment was confirmed from this experiment.

Modification Example

Although the two-dimensional spectrum SPC is divided into the plurality of blocks B(0), B(1), . . . , B(17), and then, the plurality of blocks are divided into the plurality of cells C(0,0), C(1,0), C(2,0), . . . , C(17, 2) in the above-described embodiment, the plurality of blocks B(0), B(1), . . . , B(17) may be selected as targets of the CFAR processing and the detection threshold value DT may be acquired. In this case, since the same detection threshold value DT is applied to respective signal levels at a distant place and a neighboring place in which noise environments are different, accuracy of the detection of a target may be degraded. However, in an environment in which a clutter component from a road surface is concentrated in a block corresponding to a velocity component of the two-dimensional spectrum SPC, it is possible to recognize an own vehicle velocity from a velocity component corresponding to a block in which the clutter component appears. Therefore, the two-dimensional spectrum SPC can be divided into a plurality of blocks with respect to the velocity component V, and the own vehicle velocity can be estimated from the detection threshold value DT obtained by performing the CFAR processing on the plurality of blocks.

Further, although the example in which the vehicle radar device 100 acquires the target detection data TRV through the target detection process of the target detection processing unit 150 and acquires the own vehicle velocity data DVS through the own vehicle velocity acquisition process has been described in the above-described embodiment, the vehicle radar device 100 may be configured to acquire only the own vehicle velocity data DVS.

Further, although the two-dimensional spectrum SPC is equally divided when the two-dimensional spectrum SPC is divided into the plurality of blocks B(0), B(1), . . . , B(17) in the example illustrated in FIG. 5B, the two-dimensional spectrum SPC may be unequally divided.

Further, although each of the plurality of blocks B(0), B(1), . . . , B(17) is equally divided when the plurality of blocks B(0), B(1), . . . , B(17) are divided into the plurality of cells C(0,0), C(1,0), C(2, 0), . . . , C(17, 2) in the example illustrated in FIG. 5C, the present invention is not limited to this example, and each of a plurality of blocks may be unequally divided, for example, according to the distance from the own vehicle (the vehicle radar device 100).

According to the embodiment described above, since the detection threshold value DT of the cell in which the clutter component is concentrated among the plurality of cells C(0,0), C(1,0), C(2,0), . . . , C(17,2) tends to be significantly higher than the detection threshold value DT of the other cells, the target detection processing unit 150 (the velocity specifying unit) can specify the own vehicle velocity from the velocity component V in the two-dimensional spectrum SPC corresponding to the block in which the clutter is concentrated. Accordingly, it is possible to acquire the own vehicle velocity without communicating with the vehicle. Therefore, it is not necessary to transmit information on the own vehicle velocity from the vehicle to the vehicle radar device 100, it is not necessary to acquire information on the own vehicle velocity from the vehicle side in the vehicle radar device 100, and it is possible to reduce a load of communication.

Further, according to the embodiment described above, since the threshold value obtained in a process of performing CFAR processing required for target detection is used, it is possible to accomplish the process of specifying the velocity of the own vehicle while suppressing an increase in a calculation amount.

Although the embodiments of the present invention have been described above, the present invention is not limited to the above-described embodiments, and various modifications or applications can be performed without departing from the gist of the present invention.

INDUSTRIAL APPLICABILITY

The present invention is broadly applicable to a vehicle radar device, and it is possible to acquire a velocity of an own vehicle without requiring communication with the vehicle side.

REFERENCE SIGNS LIST

100 Vehicle radar device
110 Transmission and reception unit
111 Multi-frequency CW signal generation unit
112 Transmission antenna
113 Reception antenna
114 Mixer
120 Band limiting filter
130 Analog/digital converter
140 Frequency analysis unit
150 Target detection processing unit (velocity specifying unit)

The invention claimed is:

1. A vehicle radar device, comprising:
a transmission and reception unit that changes a frequency of a transmission signal to transmit transmission waves, and receives reflected waves of the transmission waves to generate a beat signal from a reception signal obtained through receiving and the transmission signal;
a frequency analysis unit that generates a two-dimensional spectrum including a velocity component and a distance component by performing a predetermined frequency analysis process on a signal sequence of the beat signal; and
a velocity specifying unit that divides the two-dimensional spectrum into a plurality of blocks with respect to the velocity component, and performs constant false alarm rate (CFAR) processing on each of the plurality of blocks to specify a velocity of a vehicle having the vehicle radar device attached thereto based on a threshold value obtained by performing the CFAR processing.

2. The vehicle radar device according to claim 1,
wherein the velocity specifying unit divides the plurality of blocks into a plurality of cells with respect to the distance component of the two-dimensional spectrum, performs the CFAR processing on each of the plurality of cells, acquires a maximum value of a threshold value obtained by performing the CFAR processing, and specifies a velocity component of the two-dimensional spectrum corresponding to a cell in which a maximum value of the threshold value is acquired among the plurality of cells as the velocity.

3. The vehicle radar device according to claim 1, wherein the frequency analysis unit performs a two-dimensional Fast Fourier Transform (FFT) as the predetermined frequency analysis process.

4. The vehicle radar device according to claim 3, wherein the transmission and reception unit changes a frequency of the transmission signal in a first period, forms transmission waves by repeating, in a second period, the transmission signal of which the frequency is changed in the first period, transmits the transmission waves, receives reflected waves of the transmission waves, and generates the beat signal from the reception signal obtained through receiving the transmission signal, and
the frequency analysis unit performs the two-dimensional FFT on a two-dimensional signal sequence including a first signal sequence including the beat signal generated in the first period and a second signal sequence including the beat signal generated in the second period.

5. The vehicle radar device according to claim 2, wherein the frequency analysis unit performs a two-dimensional Fast Fourier Transform (FFT) as the predetermined frequency analysis process.

* * * * *